(12) United States Patent
Kamiyama et al.

(10) Patent No.: US 12,719,343 B2
(45) Date of Patent: Aug. 25, 2026

(54) LINEAR GUIDE SUPPORT STRUCTURE FOR LINEAR MOTORS

(71) Applicant: FUJI CORPORATION, Chiryu (JP)

(72) Inventors: Kazuhisa Kamiyama, Nagoya (JP); Tadashi Kumagai, Okazaki (JP); Hiroyuki Kagoshima, Kariya (JP)

(73) Assignee: FUJI CORPORATION, Chiryu (JP)

( * ) Notice: Subject to any disclaimer, the term of this patent is extended or adjusted under 35 U.S.C. 154(b) by 266 days.

(21) Appl. No.: 18/260,433

(22) PCT Filed: Feb. 18, 2021

(86) PCT No.: PCT/JP2021/006172

§ 371 (c)(1),
(2) Date: Jul. 5, 2023

(87) PCT Pub. No.: WO2022/176122

PCT Pub. Date: Aug. 25, 2022

(65) Prior Publication Data

US 2024/0072630 A1 Feb. 29, 2024

(51) Int. Cl.
*H02K 41/02* (2006.01)

(52) U.S. Cl.
CPC .................................... *H02K 41/02* (2013.01)

(58) Field of Classification Search
CPC ...... H02K 41/02; H02K 41/025; H02K 41/03; H02K 41/031; H02K 41/033

(Continued)

(56) References Cited

U.S. PATENT DOCUMENTS 4,788,477 A * 11/1988 Teramachi ........... H02K 41/033 318/135
2003/0034695 A1* 2/2003 Binnard .............. G03F 7/70716 310/12.06

(Continued)

FOREIGN PATENT DOCUMENTS

JP 2006-135200 A 6/2006
JP 2008-36813 A 2/2008

(Continued)

OTHER PUBLICATIONS

Machine translation of JP-2010258248-A. (Year: 2010).*
International Search Report issued Apr. 20, 2021 in PCT/JP2021/006172 filed on Feb. 18, 2021 3 pages.

*Primary Examiner* — Michael Andrews
(74) *Attorney, Agent, or Firm* — Oblon, McClelland, Maier & Neustadt, L.L.P.

(57) ABSTRACT

A moving device includes a first linear guide, a second linear guide to extend in parallel with the first linear guide, a first structure movable along the first linear guide, a second structure movable along the second linear guide, a slide member of which a first end is fixed to the first structure and a second end is fixed to the second structure so that the slide member is bridged between the first structure and the second structure, a first linear motor having a first stator installed to extend along the first linear guide and a first movable element fixed to the first structure to face the first stator at a predetermined interval, and a second linear motor having a second stator installed to extend along the second linear guide and a second movable element fixed to the second structure to face the second stator at a predetermined interval.

7 Claims, 7 Drawing Sheets

(58) Field of Classification Search
USPC ................................ 310/12.01, 12.05, 12.06
See application file for complete search history.

(56) References Cited

U.S. PATENT DOCUMENTS

| | | | | |
|---|---|---|---|---|
| 2003/0202167 | A1* | 10/2003 | Binnard | G03F 7/70766 355/75 |
| 2010/0208227 | A1* | 8/2010 | Zhu | G03F 7/70725 355/72 |
| 2020/0279762 | A1* | 9/2020 | Seyama | H10P 72/3202 |

FOREIGN PATENT DOCUMENTS

| | | | |
|---|---|---|---|
| JP | 2009-33940 | A | 2/2008 |
| JP | 2010258248 | A * | 11/2010 |
| JP | 2011-23616 | A | 2/2011 |
| JP | 2011-83113 | A | 4/2011 |
| JP | 2011-258805 | A | 12/2011 |
| JP | 2012-64782 | A | 3/2012 |
| JP | 2012-129317 | A | 7/2012 |
| JP | 2012-249421 | A | 12/2012 |
| JP | 2013-243270 | A | 12/2013 |
| JP | 2014-212357 | A | 11/2014 |
| JP | 2017-38059 | A | 2/2017 |
| WO | WO 2006/035835 | A1 | 4/2006 |
| WO | WO 2019/044816 | A1 | 3/2019 |

* cited by examiner

LINEAR GUIDE SUPPORT STRUCTURE FOR LINEAR MOTORS

TECHNICAL FIELD

The present description discloses a moving device.

BACKGROUND ART

Conventionally, a moving device including a beam, a pair of linear guides extending in parallel, a structure provided on each of the pair of linear guides, a beam support member including a vertical plate equipped on a side surface of a side portion of the beam and a horizontal plate fixed to a lower end of the vertical plate and fixed to an upper surface of the structure, a linear motor including a linear motor movable element vertically equipped on a side surface opposite to the beam of the vertical plate via a spacer plate and a linear motor stator positioned outside the linear motor movable element on an upper part of a side portion of a base has been proposed (refer to Patent Literature 1, for example).

PATENT LITERATURE

Patent Literature 1: JP-A-2013-243269

BRIEF SUMMARY

Technical Problem

The life of a linear guide or a guide nut attached to the linear guide depends on the magnitude of the load applied. In the above-described moving device, although it is described that the rigidity is secured by increasing the thickness of the vertical plate, the size of the device is increased.

The main object of the present disclosure is to provide a moving device that can make the device more compact.

Solution to Problem

The present disclosure employs the following means in order to achieve the above-described main object.

The moving device of the present disclosure includes a first linear guide, a second linear guide configured to extend in parallel with the first linear guide, a first structure movable along the first linear guide, a second structure movable along the second linear guide, a slide member of which a first end is fixed to the first structure and a second end is fixed to the second structure so that the slide member is bridged between the first structure and the second structure, a first linear motor having a first stator installed to extend along the first linear guide and a first movable element fixed to the first structure to face the first stator at a predetermined interval, and a second linear motor having a second stator installed to extend along the second linear guide and a second movable element fixed to the second structure to face the second stator at a predetermined interval.

The moving device according to the present disclosure includes a first structure movable along a first linear guide, a second structure movable along a second linear guide extending in parallel with the first linear guide, a slide member bridged between the first structure and the second structure, a first linear motor, and a second linear motor. The first stator of the first linear motor is installed to extend along the first linear guide, and the first movable element is fixed to the first structure to face the first stator. In addition, the second stator of the second linear motor is installed to extend along the second linear guide, and the second movable element is fixed to the second structure to face the second stator. As a result, the device can be made more compact.

DESCRIPTION OF EMBODIMENTS

Next, an embodiment of the present disclosure will be described while referring to accompanying drawings.

Figure 1:
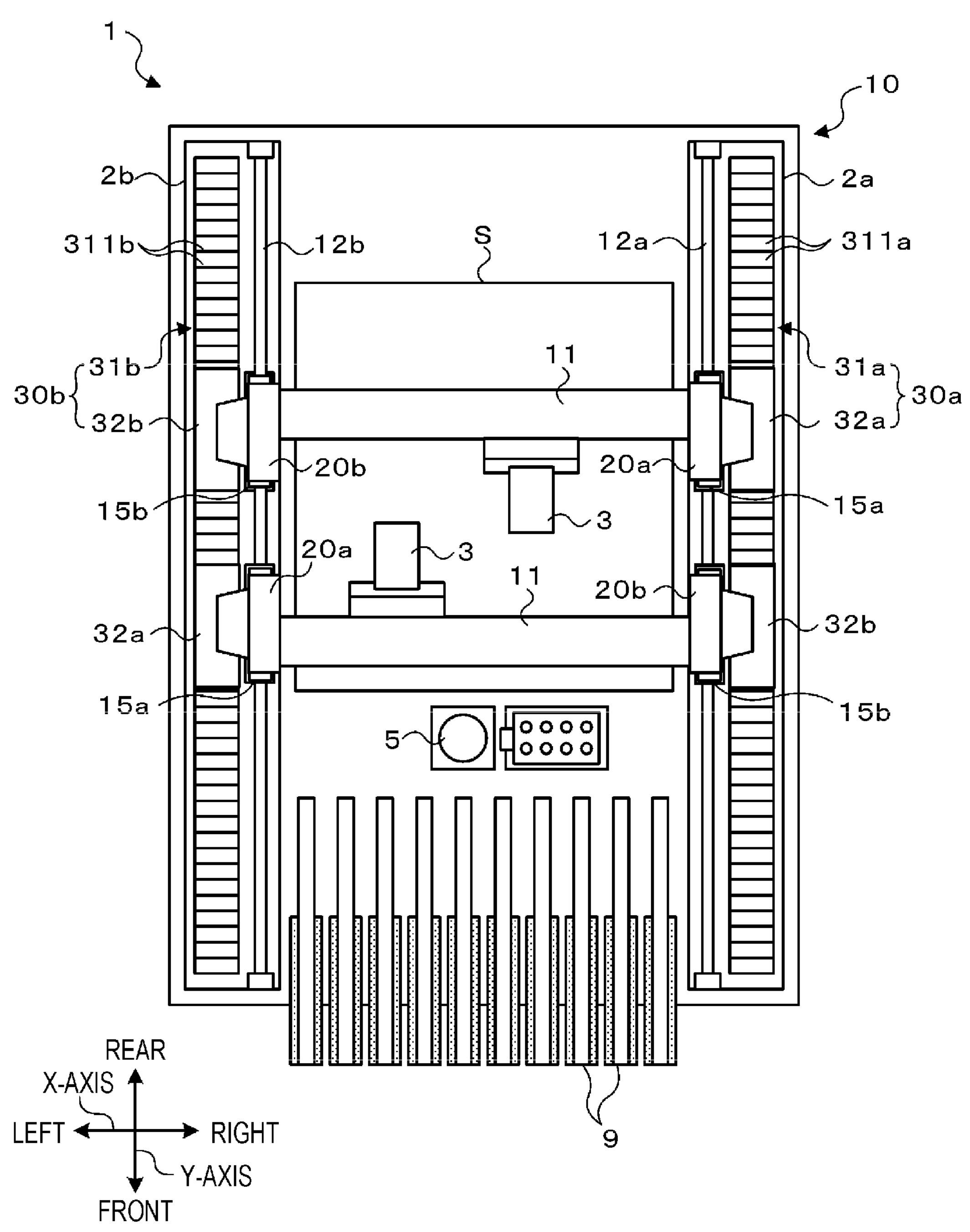
FIG. 1 is a schematic configuration view of a component mounter including a moving device of the present embodiment.
Figure 2:
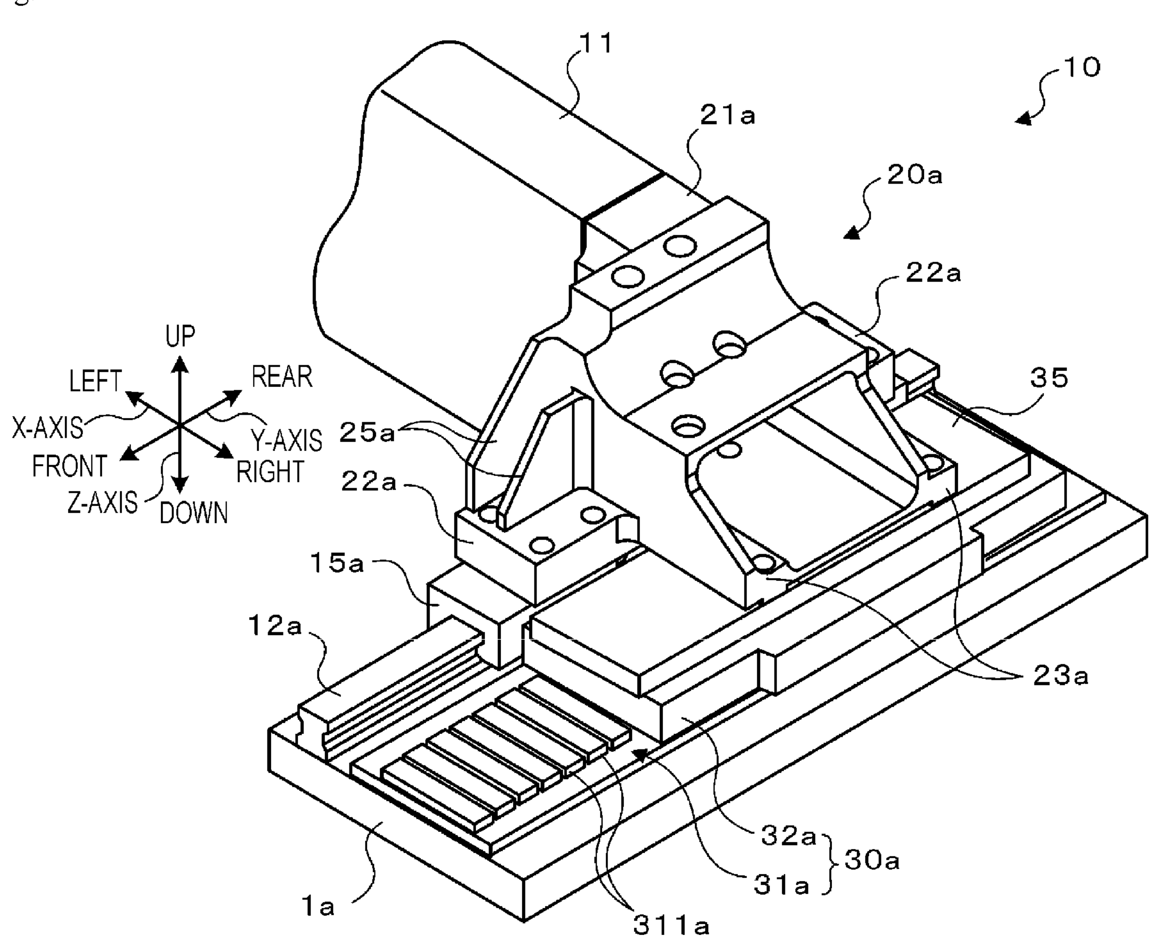
FIG. 2 is an external perspective view of the moving device of the present embodiment.
Figure 3:
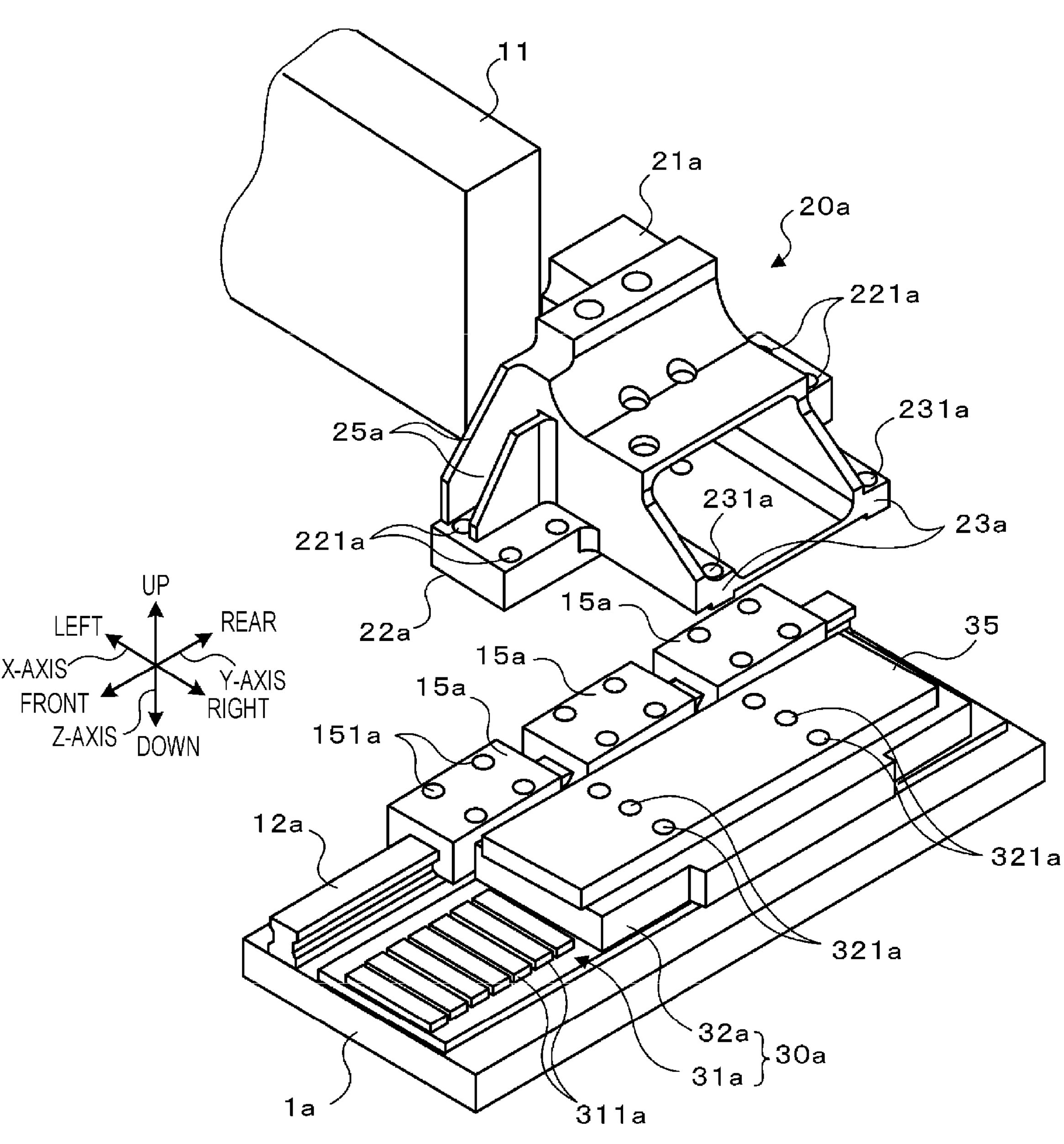
FIG. 3 is an exploded perspective view of the moving device of the present embodiment.
Figure 4:
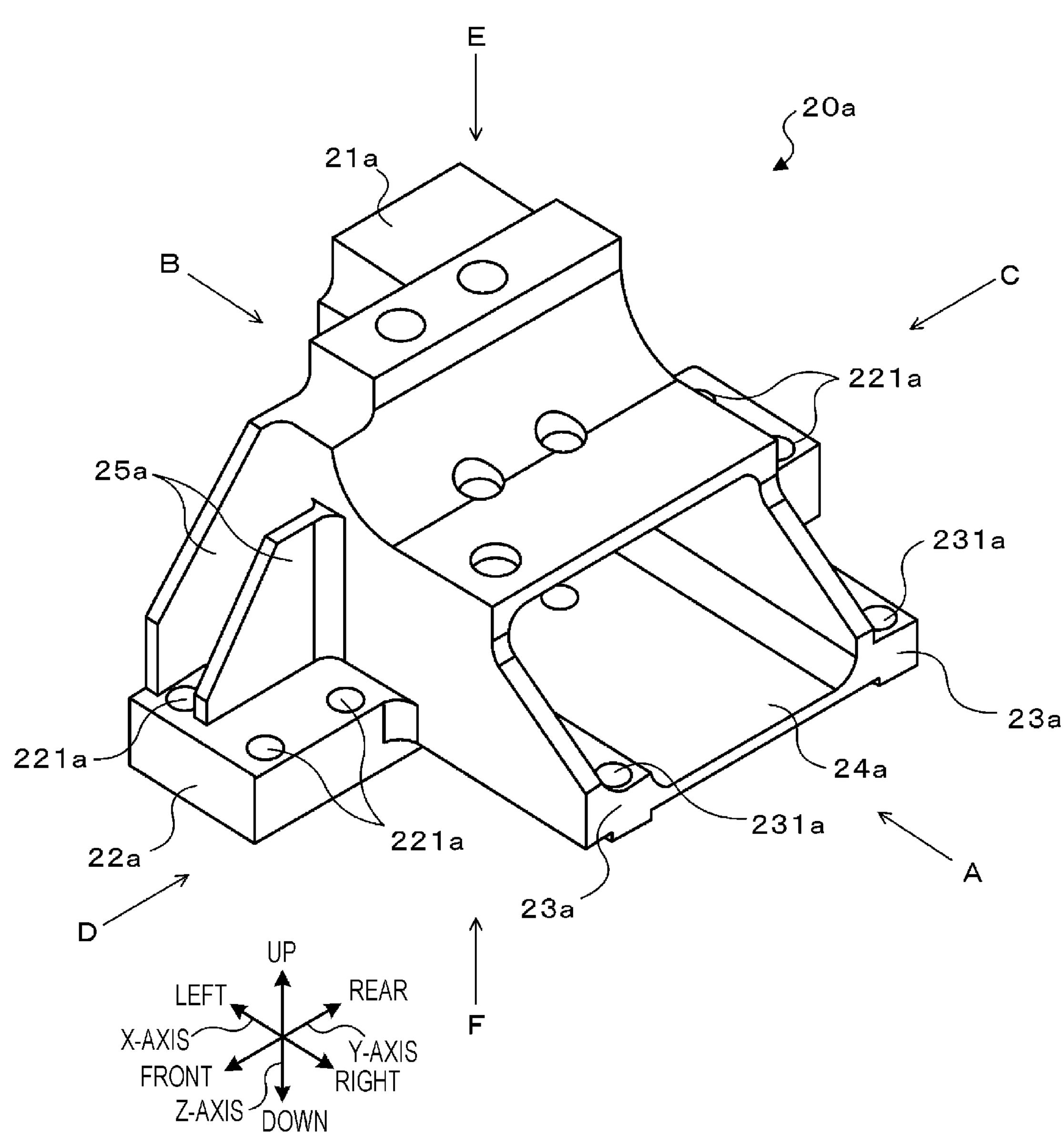
FIG. 4 is an external perspective view of a first structure.
Figure 5:
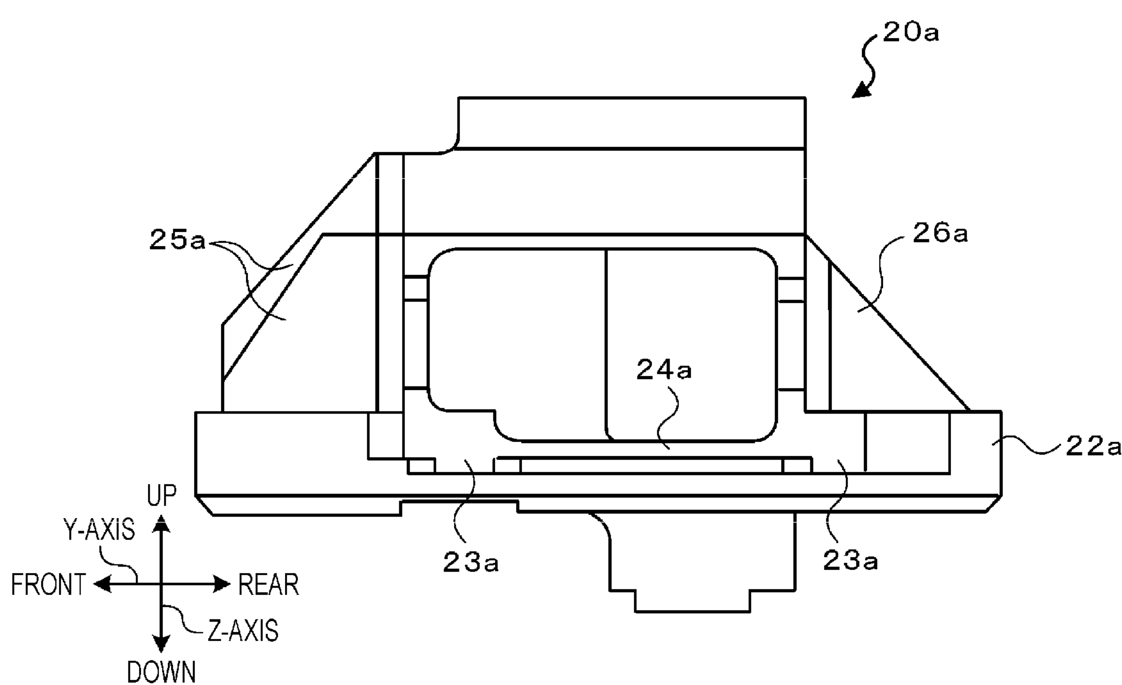
FIG. 5 is a plan view of the first structure in FIG. 4 as viewed from the A direction.
Figure 6:
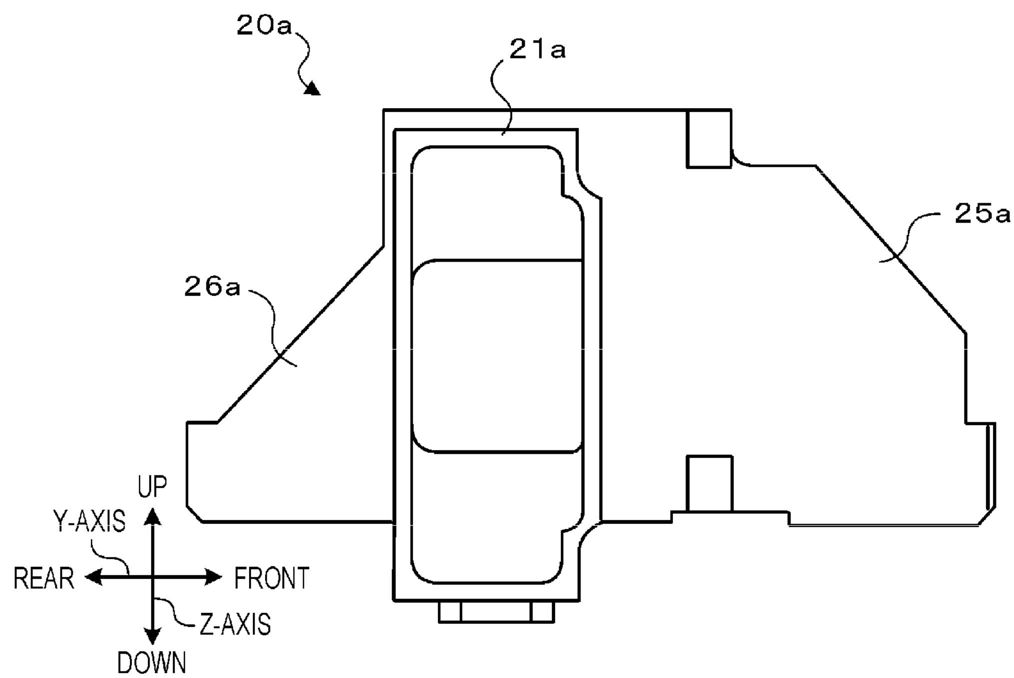
FIG. 6 is a plan view of the first structure in FIG. 4 as viewed from the B direction.
Figure 7:
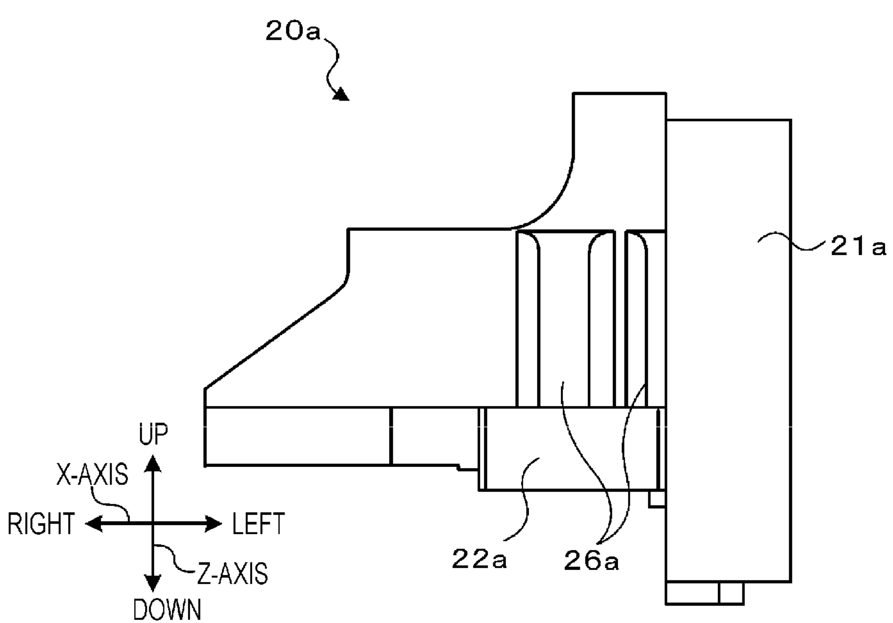
FIG. 7 is a plan view of the first structure in FIG. 4 as viewed from the C direction.
Figure 8:
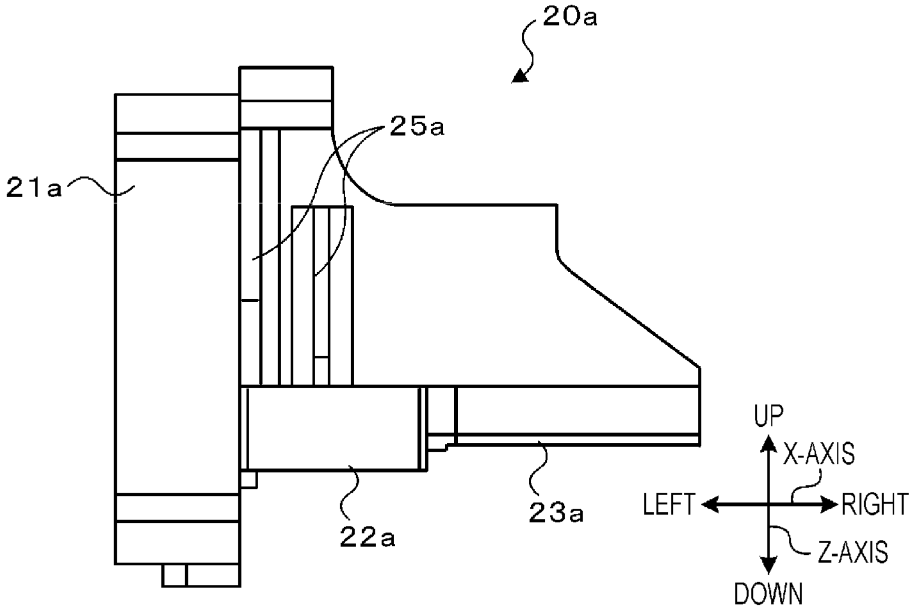
FIG. 8 is a plan view of the first structure in FIG. 4 as viewed from the D direction.
Figure 9:
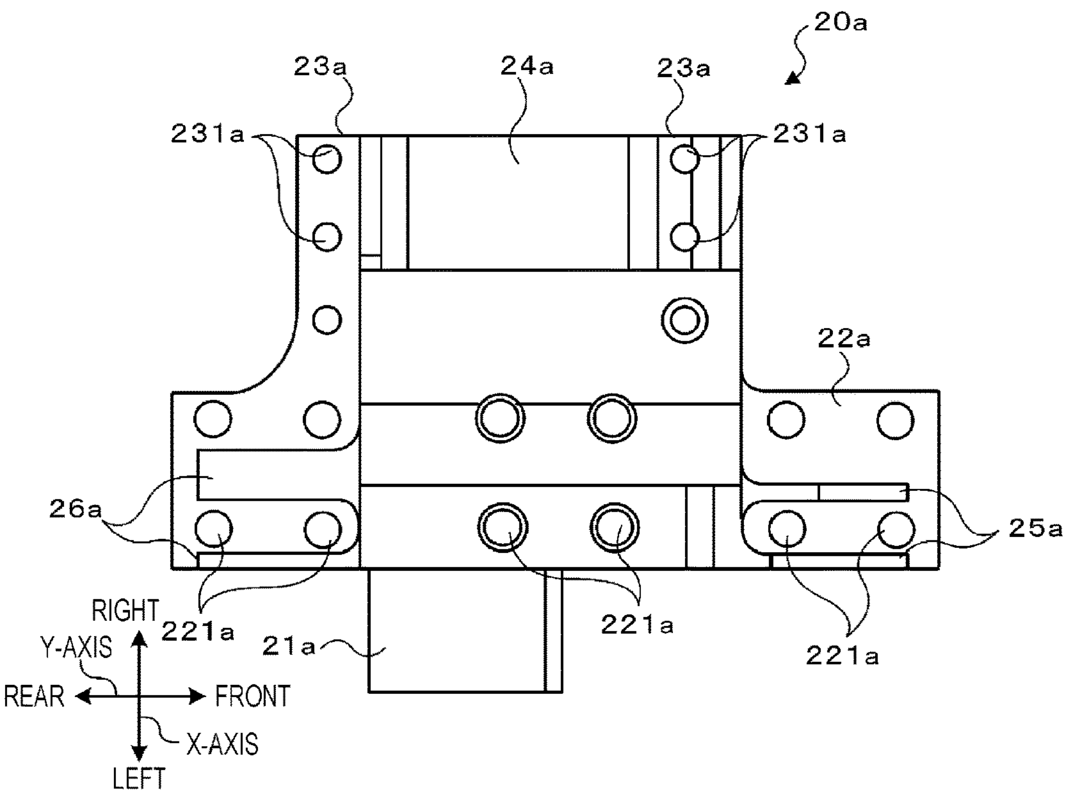
FIG. 9 is a plan view of the first structure in FIG. 4 as viewed from the E direction.
Figure 10:
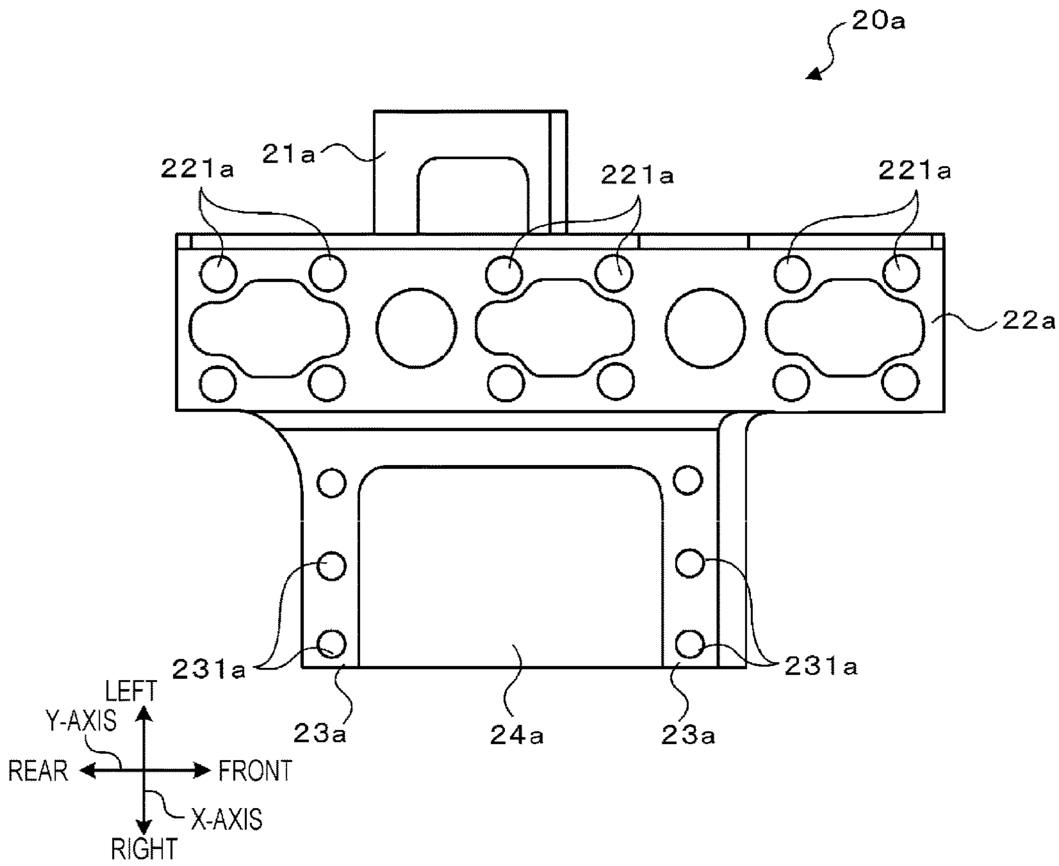
FIG. 10 is a plan view of the first structure in FIG. 4 as viewed from the F direction.

FIG. 1 is a schematic configuration view of a component mounter including a moving device of the present embodiment. FIG. 2 is an external perspective view of the moving device of the present embodiment. FIG. 3 is an exploded perspective view of the moving device of the present embodiment. FIG. 4 is an external perspective view of a first structure. FIG. 5 is a plan view of the first structure in FIG. 4 as viewed from the A direction. FIG. 6 is a plan view of the first structure in FIG. 4 as viewed from the B direction. FIG. 7 is a plan view of the first structure in FIG. 4 as viewed from the C direction. FIG. 8 is a plan view of the first structure in FIG. 4 as viewed from the D direction. FIG. 9 is a plan view of the first structure in FIG. 4 as viewed from the E direction. FIG. 10 is a plan view of the first structure in FIG. 4 as viewed from the F direction.

Moving device 10 of the present embodiment is used, for example, as illustrated in FIG. 1, in component mounter 1 that picks up components supplied from feeders 9 with head 3 and mounts the same on board S. In the present embodiment, component mounter 1 includes two heads 3 facing each other, two moving devices 10 for moving corresponding heads 3, respectively, and a board conveyance device (not illustrated) for conveying board S. Multiple board S may be conveyed into component mounter 1 to be arranged in a width direction orthogonal to a board conveyance direction, or multiple board S may be conveyed into component mounter 1 to be arranged in the board conveyance direction.

Each moving device 10 is configured as a Y-axis moving device that moves head 3 provided in component mounter 1 in a front-rear direction (Y-axis direction, width direction of board S) in the drawing, and includes slide member 11, first and second linear guides 12*a* and 12*b*, first and second structures 20*a* and 20*b*, and first and second linear motors 30*a* and 30*b*.

Slide member 11 is a prismatic member extending in a left-right direction (X-axis direction, conveyance direction of board S) in FIG. 1. A first end of slide member 11 is fixed to first structure 20*a* and a second end of slide member 11 is fixed to second structure 20*b* so that the slide member 11 is bridged between first structure 20*a* and second structure 20*b* installed at both end portions in the X-axis direction. Head 3 is equipped at one side surface portion (front surface portion) of slide member 11 in the front-rear direction (Y-axis direction) in FIG. 1 via an X-axis moving device (not illustrated). The X-axis moving device has a pair of X-axis linear guides installed on a front surface portion of slide member 1I to extend in the X-axis direction, and moves head 3 in the X-axis direction along the X-axis linear guides. Details of the X-axis moving device will not be described because they do not form the gist of the present disclosure.

As illustrated in FIG. 1, first and second linear guides 12*a* and 12*b* are rail members extending in parallel with each other along the front-rear direction (Y-axis direction). Band-shaped first and second support members 2*a* and 2*b* extending in the Y-axis direction at both end portions in the left-right direction (X-axis direction) are fixed to an upper stage of a frame of component mounter 1. First linear guide 12*a* is installed on a planar upper surface of first support member 2*a*. Second linear guide 12*b* is installed on a planar upper surface of second support member 2*b*. On first linear guide 12*a*, as illustrated in FIG. 3, multiple (three) first guide nuts 15*a* are slidably attached to first linear guide 12*a*. Similarly, on second linear guide 12*b*, multiple (three) second guide nuts are slidably attached to second linear guide 12*b*.

In the present embodiment, as illustrated in FIGS. 1 to 3, first linear motor 30*a* is configured as a flat linear motor having first stator 31*a* in which multiple permanent magnets 311*a* are installed in a flat manner, and first movable element 32*a* supported by first structure 20*a* to face first stator 31*a* at predetermined intervals above and below. Each permanent magnet 311*a* of first stator 31*a* is linearly arranged on the upper surface of first support member 2*a* so that the polarities of the N pole and the S pole are alternately different along first linear guide 12*a*. In the present embodiment, each permanent magnet 311*a* of first stator 31*a* is installed on the same plane as first linear guide 12*a*. Although not illustrated, first movable element 32*a* has three cores each formed by stacking electromagnetic steel sheets, and three coils each wound around a corresponding core. First movable element 32*a* moves in the front-rear direction (Y-axis direction) by applying three-phase AC currents to the three coils.

Similar to first linear motor 30*a*, second linear motor 30*b* is configured as a flat linear motor having second stator 31*b* in which multiple permanent magnets 311*b* are installed in a flat manner, and second movable element 32*b* supported by second structure 20*b* to face second stator 31*b* at predetermined intervals above and below. Each permanent magnet 311*b* of second stator 31*b* is linearly arranged on the upper surface of second support member 2*b* so that the polarities of the N pole and the S pole are alternately different along second linear guide 12*b*. In the present embodiment, each permanent magnet 311*b* of second stator 31*b* is installed on the same plane as second linear guide 12*b*. Although not illustrated, second movable element 32*b* has three cores each formed by stacking electromagnetic steel sheets, and three coils each wound around a corresponding core. Second movable element 32*b* moves in the front-rear direction (Y-axis direction) by applying three-phase AC currents to the three coils.

A first end of slide member 11 is fixed to movable element 31*a* of first linear motor 30*a* via first structure 20*a*, and a second end of slide member 11 is fixed to movable element 31*b* of second linear motor 30*b* via second structure 20*b*. Therefore, by synchronously driving first and second linear motors 30*a* and 30*b*, slide member 11 can be moved in the front-rear direction (Y-axis direction). Since head 3 is equipped on slide member 11, head 3 can be moved in the Y-axis direction by moving slide member 11 in the Y-axis direction.

First structure 20*a* is a rectangular cylindrical structure that opens in the left-right direction (X-axis direction), and is movably installed in the Y-axis direction with respect to first linear guide 12*a* via multiple (three) first guide nuts 15*a*, as illustrated in FIGS. 2 and 3. First structure 20*a* has first attachment portion 21*a*, second attachment portion 22*a*, and third attachment portion 23*a*.

As illustrated in FIGS. 2 and 3, first attachment portion 21*a* is equipped at the first end portion of slide member 11. First attachment portion 21*a* is a side surface portion of the inside (head 3 side) in the left-right direction (X-axis direction), and is formed at a position deviated rearward from the center in the front-rear direction (Y-axis direction) of first structure 20*a*, as illustrated in FIG. 6.

As illustrated in FIGS. 2 and 3, second attachment portion 22*a* is equipped on upper surfaces of multiple (three) first guide nuts 15*a* attached to first linear guide 12*a*. As illustrated in FIG. 10, second attachment portion 22*a* is formed on a bottom surface portion of first structure 20*a*, and multiple bolt holes 221*a* (refer to FIGS. 9 and 10) and 151*a* (refer to FIG. 3) that respectively penetrate in an up-down direction (Z-axis direction) are formed on a mating surface between first attachment portion 21*a* and multiple first guide nuts 15*a*. In first structure 20*a*, bolt holes 221*a* and 151*a* corresponding to the attachment positions between first structure 20*a* and multiple first guide nuts 15*a* communicate with each other, and bolts (not illustrated) are inserted through bolt holes 221*a* and 151*a* and fasten to fix multiple first guide nuts 15*a*. As described above, since multiple first guide nuts 15*a* are slidably attached to first linear guide 12*a* in the front-rear direction (Y-axis direction), first structure 20*a* moves in the Y-axis direction integrally with multiple first guide nuts 15*a*.

As illustrated in FIGS. 2 and 3, third attachment portion 23*a* is equipped on first movable element 32*a*. In the present embodiment, air-cooling type cooling device 35 for cooling first movable element 32*a* is interposed between third attachment portion 23*a* and first movable element 32*a*. As illustrated in FIG. 10, third attachment portion 23*a* extends in the X-axis direction (right direction) so as to face first stator 31*a* at both end portions in the front-rear direction (Y-axis direction) of the bottom surface portion of first structure 20. As illustrated in FIGS. 9 and 10, multiple bolt holes 231*a* that penetrate in the up-down direction (Z-axis direction) are formed in each third attachment portion 23*a*. In first structure 20*a*, bolt hole 231*a* communicates with bolt hole 321*a* formed in cooling device 35 and first movable element 32*a* at the attachment position between first structure 20*a* and first movable element 32*a*, and bolts (not illustrated) are inserted through bolt holes 231*a* and 321*a* and fastened to fix first movable element 32*a* so as to face first stator 31*a* at predetermined intervals above and below.

As illustrated in FIGS. 4, 5, and 6, second attachment portion 22*a* extends in the front-rear direction (Y-axis direction) in the drawings, and an L-shaped surface (L-shaped surface) is formed by an upper surface of second attachment portion 22*a* (bottom surface portion) on both side wall portions of the rectangular cylinder of first structure 20*a* in the front-rear direction (Y-axis direction). Multiple (two) first ribs 25*a* are formed on a first L-shaped surface. Multiple (two) second ribs 26*a* are formed on a second L-shaped surface. First and second ribs 25*a* and 25*b* are reinforcing members, and are formed to be asymmetrical in thickness and shape, as illustrated in FIGS. 7 to 9. Further, as illustrated in FIGS. 4 and 5, thin portion 24*a* is formed between both third attachment portions 23*a* on the bottom surface portion of the rectangular cylinder in first structure 20*a*. Thin portion 24*a* is intended to reduce the weight while securing the strength of first structure 20*a* by increasing the thickness of second and third attachment portions 22*a* and 23*a*, which are the bolt fastening portions.

Second structure 20*b* is a structure in which first structure 20*a* is mirror-reversed, and is installed to be movable in the Y-axis direction with respect to second linear guide 12*b* via multiple (three) second guide nuts 15*b*. Although not illustrated, second structure 20*b* has a first attachment portion, a second attachment portion, and a third attachment portion similar to first structure 20*a*. The first attachment portion of second structure 20*b* is equipped at the second end portion of slide member 11. The first attachment portion is a side surface portion of the inside (head 3 side) in the left-right direction (X-axis direction), and is formed at a position deviated rearward from the center in the front-rear direction (Y-axis direction) of second structure 20*b*. The second attachment portion is equipped on upper surfaces of multiple (three) second guide nuts 15*b* attached to second linear guide 12*b*. First structure 20*a* moves in the Y-axis direction integrally with multiple second guide nuts 15*b*. The third attachment portion is equipped on second movable element 32*b* of second linear motor 30*b*, and fixes second movable element 32*b* so as to face second stator 31*b* at a predetermined interval. In the present embodiment, an air-cooling type cooling device for cooling second movable element 32*b* is interposed between the third attachment portion and second movable element 32*b*. In addition, second structure 20*b* is also formed with multiple first and second ribs or the thin portion similar to first structure 20*a*.

As described above, head 3, which is a heavy object, is equipped on the front surface of slide member 11, and slide member 11 is fixed to first structure 20*a* and second structure 20*b*, which support both end portions of slide member 11 in the left-right direction (X-axis direction), at positions deviated rearward from the center portion in the front-rear direction (Y-axis direction). As a result, the weight balance can be improved, so that the loads applied to multiple first and second guide nuts 15*a* and 15*b* that support first and second structures 20*a* and 20*b*, respectively, can be equalized.

Further, a torsional moment acts on first and second structures 20*a* and 20*b* fixed to both end portions of slide member 11 around the X-axis by the gravity of head 3 equipped on slide member 11. However, since first and second ribs 25*a* and 26*a* are formed on both side wall portions of the rectangular cylinder of first and second structures 20*a* and 20*b* in the Y-axis direction, it is possible to suppress the deformation of first and second structures 20*a* and 20*b* due to the torsional moment, and it is possible to avoid concentration of stress at specific portions of first and second structures 20*a* and 20*b*, first and second guide nuts 15*a* and 15*b*, and first and second linear guides 12*a* and 12*b*. In addition, since the thicknesses and shapes of first and second ribs 25*a* and 25*b* provided as the reinforcing members in first and second structures 20*a* and 20*b* are made asymmetrical, it is possible to intensively reinforce necessary portions and suppress an increase in weight. As a result, it is possible to improve the durability of first and second structures 20*a* and 20*b*, first and second guide nuts 15*a* and 15*b*, and first and second linear guides 12*a* and 12*b*.

As a matter of course, the present disclosure is not limited to the above-described embodiment in any way, and it is needless to say that the present disclosure can be embodied in various aspects as long as the aspects fall within the technical scope of the present disclosure.

For example, in the above-described embodiment, first and second structures 20*a* and 20*b* have thin portion 24*a* between third attachment portions 23*a* on the bottom surface portion of the rectangular cylinder. However, first and second structures 20*a* and 20*b* may have through holes for reducing the weight instead of thin portion 24*a* or in addition to thin portion 24*a*. Alternatively, the thin portion or the through holes may not be provided.

In the above-described embodiment, first and second structures 20*a* and 20*b* have ribs 25*a* and 26*a* on both side wall portions of the rectangular cylinder in the Y-axis direction. However, both side wall portions may be formed by thick portions.

In addition, in the moving device of the present disclosure, the following configuration can be adopted. In other words, in the moving device of the present disclosure, the first stator and the second stator may be respectively installed in a flat manner. In this way, the device can be made more compact in the height direction.

In the moving device of the present disclosure, the first stator may be installed on the same plane as the first linear guide, and the second stator may be installed on the same plane as the second linear guide. In this way, it is possible to easily secure the installation accuracy of the first and second linear motors.

In the moving device of the present disclosure, the slide member may be attached with a moving target object at an end portion on a first side in a movement direction and be fixed at a position deviated from the first structure and the second structure on a second side in the movement direction. In this way, it is possible to improve the weight balance of the moving target object. In this case, the first structure and the second structure may have a cylindrical portion opened in a direction orthogonal to the movement direction, and may have reinforcing portions on both sides of the cylindrical portion in the movement direction. In this way, even if the torsional moment acts by the gravity of the moving target object, it is possible to suppress the deformation of the first and second structures. Further, in this case, the reinforcing portions may be provided asymmetrically. In this way, it is possible to intensively reinforce necessary portions and suppress an increase in weight.

In these cases, the first structure and the second structure may have fastening portions for fixing movable elements corresponding to both sides of the cylindrical portion in the movement direction, and may have a thin portion between both fastening portions of the cylindrical portion. In this way, it is possible to be intended to reduce the weight of the first and second structures while securing the strength thereof.

The moving device according to the present disclosure may include multiple first guide nuts slidably attached to the first linear guide, and multiple second guide nuts slidably attached to the second linear guide, in which the first structure may be supported and fixed on upper surfaces of the multiple first guide nuts, and the second structure may be supported and fixed on upper surfaces of the multiple second guide nuts.

INDUSTRIAL APPLICABILITY

The present disclosure can be applied to a manufacturing industry of a moving device or the like.

REFERENCE SIGNS LIST

1: component mounter, 2*a*, 2*b*: frame, 3: head, 9: component supply device, 10: moving device, 11: slide member, 12*a*: first linear guide, 12*b*: second linear guide, 15*a*: first guide nut, 15*b*: second guide nut, 20*a*: first structure, 20*b*: second structure, 21*a*: first attachment portion, 22*a*: second attachment portion, 23*a*: third attachment portion, 24*a*: thin portion, 25*a*, 26*a*: rib, 30*a*: first linear motor, 30*b*: second linear motor, 31*a*: first stator, 31*b*: second stator, 32*a*: first movable element, 32*b*: second movable element, 151*a*, 221*a*, 231*a*, 321*a*: bolt hole, 311*a*, 311*b*: permanent magnet, S: board

The invention claimed is:

1. A moving device comprising:

a first linear guide that extends in a front-rear direction of the moving device;

a second linear guide configured to extend in parallel with the first linear guide;

a first structure movable along the first linear guide;

a second structure movable along the second linear guide;

a slide member of which a first end is fixed to the first structure and a second end is fixed to the second structure so that the slide member is bridged between the first structure and the second structure in a left-right direction of the moving device, the slide member being attached with a head at an end portion on a first side in a movement direction and is fixed at a position deviated from the first structure and the second structure on a second side in the movement direction;

a first linear motor having a first stator installed to extend along the first linear guide and a first movable element fixed to the first structure to face the first stator at a predetermined interval;

a second linear motor having a second stator installed to extend along the second linear guide and a second movable element fixed to the second structure to face the second stator at a predetermined interval;

multiple first guide nuts slidably attached to the first linear guide; and multiple second guide nuts slidably attached to the second linear guide, wherein each of the first structure and the second structure includes a first attachment portion, a second attachment portion, and a third attachment portion, wherein the first attachment portion of the first structure is attached to a first end portion of the slide member in the left-right direction and is formed at a position rearward from a center of the first structure in the front-rear direction, and the first attachment portion of the second structure is attached to a second end portion of the slide member in the left- right direction and is formed at a position rearward from a center of the second structure in the front-rear direction, wherein the second attachment portion of the first structure is attached to upper surfaces of the multiple first guide nuts, is formed on a bottom surface portion of the first structure, and includes bolt holes formed on a mating surface between the first attachment portion of the first structure and the multiple first guide nuts, and the second attachment portion of the second structure is attached to upper surfaces of the multiple second guide nuts, is formed on a bottom surface portion of the second structure, and includes bolt holes formed on a mating surface between the first attachment portion of the second structure and the multiple second guide nuts, wherein the third attachment portion of the first structure is attached to the first movable element and extends in the left-right direction so as to face the first stator at both end portions in the front-rear direction of the bottom surface portion of the first structure, and the third attachment portion of the second structure is attached to the second movable element and extends in the left-right direction so as to face the second stator at both end portions in the front-rear direction of the bottom surface portion of the second structure, wherein the first movable element includes first coils and the second movable element includes second coils, and wherein the first stator and the second stator each include permanent magnets that respectively face the first coils of the first movable element and the second coils of the second movable element in an up-down direction of the moving device.

2. The moving device according to claim 1, wherein the first stator and the second stator are respectively installed in a flat manner.

3. The moving device according to claim 1, wherein the first stator is installed on a frame of the moving device in the same plane as the first linear guide, and the second stator is installed on the frame in the same plane as the second linear guide.

4. The moving device according to claim 1, wherein the first structure and the second structure have a cylindrical portion opened in a direction orthogonal to the movement direction, and have reinforcing portions on both sides of the cylindrical portion in the movement direction.

5. The moving device according to claim 4, wherein the reinforcing portions are provided asymmetrically.

6. The moving device according to claim 4, wherein the third attachment portions of the first structure and the second structure each have fastening portions configured to fix movable elements corresponding to both sides of the cylindrical portion in the movement direction, and have a thin portion between both fastening portions of the cylindrical portion.

7. The moving device according to claim 4, wherein the reinforcing portions are formed on an upper surface of the second attachment portions of the first structure and the second structure.

* * * * *